(12) United States Patent
Hietala et al.

(10) Patent No.: US 8,532,480 B2
(45) Date of Patent: Sep. 10, 2013

(54) ELECTRONIC DEVICE, COVER AND METHOD

(75) Inventors: Joni Hietala, Viiala (FI); Juho Jalava, Marynummi (FI); Anu Laine, Vantaa (FI)

(73) Assignee: Lite-On Mobile Oyj, Vantaa (FI)

( * ) Notice: Subject to any disclaimer, the term of this patent is extended or adjusted under 35 U.S.C. 154(b) by 51 days.

(21) Appl. No.: 13/270,414

(22) Filed: Oct. 11, 2011

(65) Prior Publication Data

US 2012/0093498 A1   Apr. 19, 2012

(30) Foreign Application Priority Data

Oct. 15, 2010  (FI) ...................................... 20106071

(51) Int. Cl.
*G03B 17/02* (2006.01)
(52) U.S. Cl.
USPC ......................................................... 396/535
(58) Field of Classification Search
USPC ......................................................... 396/535
See application file for complete search history.

(56) References Cited

U.S. PATENT DOCUMENTS

| | | | | |
|---|---|---|---|---|
| 6,134,121 A * | 10/2000 | Braxton | ........................ | 361/818 |
| 6,449,164 B1 * | 9/2002 | Gershfeld | ..................... | 361/752 |
| 7,515,431 B1 * | 4/2009 | Zadesky et al. | ............... | 361/752 |
| 7,649,744 B2 * | 1/2010 | Zadesky et al. | ............... | 361/752 |
| 7,839,646 B2 * | 11/2010 | Zadesky et al. | ............... | 361/728 |
| 7,894,185 B2 * | 2/2011 | Weber et al. | ............. | 361/679.56 |
| 8,023,261 B2 * | 9/2011 | Sanford et al. | ........... | 361/679.55 |
| 2003/0100275 A1 * | 5/2003 | Hsu et al. | ........................ | 455/90 |
| 2004/0095500 A1 * | 5/2004 | Sato et al. | ..................... | 348/340 |
| 2004/0096205 A1 * | 5/2004 | Kato et al. | ..................... | 396/350 |
| 2006/0033832 A1 * | 2/2006 | Shin | .............................. | 348/335 |
| 2006/0268528 A1 | 11/2006 | Zadesky et al. | | |
| 2008/0125171 A1 * | 5/2008 | Shin | .......................... | 455/556.1 |
| 2009/0164035 A1 * | 6/2009 | Zadesky et al. | .................. | 700/94 |
| 2009/0185344 A1 * | 7/2009 | Zadesky et al. | .......... | 361/679.56 |
| 2010/0008040 A1 | 1/2010 | Weber et al. | | |
| 2010/0114346 A1 * | 5/2010 | Zadesky et al. | .................. | 700/94 |
| 2011/0165915 A1 * | 7/2011 | Kim et al. | ..................... | 455/566 |
| 2011/0261514 A1 * | 10/2011 | Lee et al. | ................. | 361/679.01 |
| 2012/0069517 A1 * | 3/2012 | Prest et al. | ................ | 361/679.56 |

FOREIGN PATENT DOCUMENTS

| | | |
|---|---|---|
| EP | 1809006 A1 | 7/2007 |
| EP | 2009519 A2 | 12/2008 |
| WO | 2009126480 A2 | 10/2009 |

OTHER PUBLICATIONS

Hot Runner, Eimo-ryhman asiakaslehti, marraskuu 2000 sivut 4-6.
Finnish Search Report, dated Jun. 9, 2011.
Nicole, Ultra-Slim Transparent Cell Phone, http://www.techfresh.net/ultra-slim-transparent-cellphone/, Dec. 17, 2007, pp. 1-5.

\* cited by examiner

*Primary Examiner* — Rodney Fuller
(74) *Attorney, Agent, or Firm* — Young & Thompson

(57) ABSTRACT

A cover part for an electronic device, an electronic device and a method. The cover structure (2) for an electronic device provides a cavity (3) into which an electronic part of the electronic device (1) may be arranged. The cover structure (2) includes an enclosing structure (5), which is tubular in shape and at least one end (6a, 6b) of which enclosing structure (5) is open, the end (6a, 6b) including a receiving structure (7a, 7b) for fitting an end element (8a, 8b), which closes the end, into the enclosing structure (5).

22 Claims, 4 Drawing Sheets

ELECTRONIC DEVICE, COVER AND METHOD

BACKGROUND OF THE INVENTION

The invention relates to a cover structure for an electronic device, which cover structure provides a cavity into which an electronic part of the electronic device may be arranged.

The invention further relates to an electronic device, which comprises a cover structure providing a cavity, in which an electronic part of the electronic device is arranged.

Yet further, the invention relates to a method for manufacturing a cover structure for an electronic device.

The cover structure of electronic devices, in particular portable electronic devices, such as mobile phones, communicators, palmtop computers, portable computers, game consoles or controllers, playback devices for audio and/or visual material, shavers or the like, typically comprises one or more cover parts joined either fixedly or openably together and/or to the frame of the device. A closed space formed by the cover structure houses the electric components required by the functions of the electronic device, and the components are protected by the cover structure from dust, dirt and mechanical stress, for instance. The cover parts are typically thin-walled products made usually of plastic, metal or plastic composite.

A problem with the above basic structures is that the cover structures are complex and comprise several joints.

BRIEF DESCRIPTION OF THE INVENTION

An object of the present invention is to provide a novel and improved electronic device, a cover and a method for manufacturing the cover.

The electronic device, cover and method of the invention are characterized by what is disclosed in the characterizing parts of the independent claims. Other embodiments of the invention are characterized by what is disclosed in the other claims.

Inventive embodiments are also disclosed in the specification and drawings of this patent application. The inventive content of the patent application may also be defined in other ways than those defined in the following claims. The inventive content may also consist of several separate inventions, especially if the invention is examined in the light of expressed or implicit subtasks or in view of obtained benefits or benefit groups. In such a case, some of the definitions contained in the following claims may be unnecessary in view of the separate inventive ideas. Features of the different embodiments of the invention may be applied to other embodiments within the scope of the basic inventive idea.

In the following, features of some embodiments of the invention are listed in a random order:

The cover structure has a one-piece enclosing structure.

The enclosing structure is a structure consisting of several pieces whose joint lines are finished to be seamless on the exterior.

Both ends of the cover structure are open and closable with end elements.

The dimensions of the first end of the enclosing structure are equal to those of the second end.

The cross section of the outer surface of the enclosing structure is constant throughout its entire length.

The end element is dimensioned to be larger than the outer measurements of the end of the enclosing structure.

The enclosing structure comprises a see-through area, which allows visual contact into the cavity.

The enclosing structure is made of transparent material and the see-through area comprises said transparent material.

The see-through area is provided by defining it by a frame layer.

In the see-through area the enclosing structure becomes thinner from the first end towards the second end so that the inner surface thereof forms a wedge-like surface.

In the see-through area the enclosing structure becomes thinner both towards the first end and towards the second end so that the inner surface thereof forms a double-wedge-like surface.

In the see-through area the enclosing structure is constant in thickness.

The see-through area comprises an opening in the enclosing structure, and in said opening there is arranged a protective window for a display.

In the enclosing structure there is arranged a capacitive actuator button.

In the enclosing structure there are arranged optical elements of a camera.

The enclosing structure comprises polymer material.

The enclosing structure comprises metal.

The electronic part is designed such that it may be inserted into and/or removed from the cavity through the end.

The electronic device comprises a device body which may be inserted into and/or removed from the cavity through the end.

The electronic part is arranged in the device body such that it may be inserted into and/or removed from the cavity through the end when arranged in the device body.

The electronic device includes a camera, optical elements of which are arranged in the end element.

The end element constitutes a pop-up element, and the optical elements of the camera are arranged to have shelter inside the enclosing structure by moving the end element.

The electronic device comprises a display element and the cover structure comprises a see-through area that is arranged above the display element.

The refractive index of a transparent filler is at least substantially as high as the refractive index of the enclosing structure.

The electronic device is a mobile telecommunication device.

The whole enclosing structure is manufactured simultaneously and in one piece.

There are manufactured at least two parts for the enclosing structure, said parts are interconnected to form the enclosing structure and the outer surface of the enclosing structure is finished to be seamless.

There is made a see-through area in the enclosing structure.

A molded piece is molded of transparent polymer material, the polymer material forming the see-through area is conveyed to a mold cavity part having a wedge-like cross section, in which the inner surface of the see-through area is provided by a core having a wedge-like surface, the polymer material forming the see-through area is allowed to harden to form a layer that becomes thinner towards the first end of the enclosing structure, and the core having the wedge-like surface is moved away from the inner surface of the see-through area towards said first end.

A molded piece is molded of transparent polymer material, the polymer material forming the see-through area is conveyed to a mold cavity part having a double-wedge-like cross section, in which the inner surface of the see-through area is provided by two successive cores having a wedge-like surface, the polymer material forming the see-through area is allowed to harden to form a layer that becomes thinner towards the first end and the second end of the enclosing structure, and after the hardening of the polymer material the first core having the wedge-like surface is moved towards said first end, and correspondingly, the second core having a wedge-like surface towards the opposite, second end away from the inner surface of the see-through area.

A molded piece is molded of transparent polymer material, the polymer material forming the see-through area is conveyed to a mold cavity part having parallel mold surfaces, in which the inner surface of the see-through area is formed by a first core part that is arranged movably to a second core part, the polymer material forming the see-through area is allowed to harden to form a layer of at least substantially constant thickness, after hardening the first core part is moved away, perpendicularly to the inner surface of the see-through area into the second core part, and the first core part is moved away from the inner surface of the see-through area together with the second core part.

A molded piece is made by injection molding, an injection gate of an injection mold is arranged at the end of the molded piece, and a molded part comprising an injection gate stalk is machined off the end of the molded piece.

The see-through area is prepared by arranging a window insert in the mold and by molding the molded piece such that at least part of the window insert will remain transparent.

The basic idea of the invention is that the cover structure is formed of a tubular enclosing structure and one or more end elements that close it.

An advantage is that the cover structure has only few seams.

The basic idea of a preferred embodiment of the invention is that the enclosing structure consists of one piece.

An advantage is that the number and length of seams is very small.

BRIEF DESCRIPTION OF THE FIGURES

Some embodiments of the invention will be explained in greater detail in the attached drawings, in which.

In the figures, some embodiments of the invention are shown simplified for the sake of clarity. Like reference numerals refer to like parts in the figures.

DETAILED DESCRIPTION OF THE INVENTION

Figure 1:
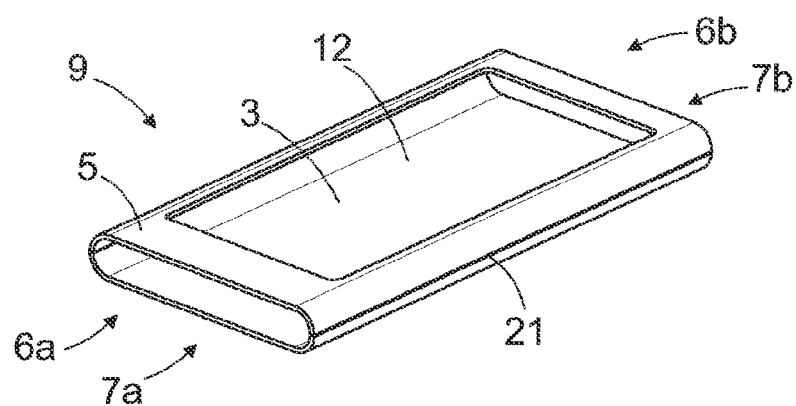
FIG. 1 is a schematic perspective view of a part of the cover structure according to the invention.

FIG. 1 is a schematic perspective view of an enclosing structure 5 of a cover structure according to the invention.

The enclosing structure 5 has a shape of a tube that is made of polymer material. The polymer material may include, apart from the polymer, also fillers, reinforcements, colorants, etc. The enclosing structure may also be made of metal, or it may comprise parts made of both polymer material and metal.

The cross section of the enclosing structure 5 shown in FIG. 1 comprises two mutually parallel, flat planes, which constitute the front and rear surfaces of the enclosing structure, and curved edge parts connecting them. It is clear that the cross section of the enclosing structure may also be different, e.g. oval, polygonal, round, etc.

The tube, i.e. the enclosing structure 5, comprises two open ends 6a, 6b, which are provided with receiving structures 7a, 7b. The measurements of the first end 6a are here equal to those of the second end 6b, but this is by no means necessary.

In the receiving structures 7a, 7b there are arranged end elements which close the ends and which will be described in greater detail later on. At its simplest, the receiving structure 7a, 7b is a straight or a bevelled edge of the enclosing structure 5.

In another embodiment the enclosing structure 5 has only one open end 6a, 6b, which is closed with an end element. The second end is manufactured in a closed manner during the manufacturing of the enclosing structure. Said closed end may be at least substantially of the same shape and size as the open end, or alternatively, it may be completely different: the cover structure may resemble, for instance, a tube with one end open and the other end flattened closed.

The enclosing structure 5 and the end elements form a cavity 3, into which an electronic part of the electronic device may be fitted.

The enclosing structure 5 comprises a see-through area 9, which in this embodiment is implemented by providing an opening 12 in the front surface of the enclosing structure extending therethrough.

The enclosing structure 5 is made of two separately made and interconnected pieces, of which the first one forms the front surface and the second one the rear surface of the cover part. The pieces may be manufactured, for instance, by injection molding or pressing.

At the juncture of the pieces there is a joint line 21. The outer surfaces of the joint lines 21 are finished to be seamless, for instance, by abrading, polishing and/or milling.

Figure 2A:
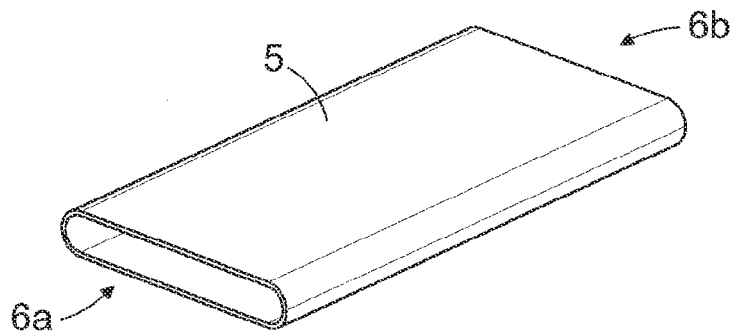
FIG. 2a is a schematic perspective view of a second part of the cover structure according to the invention.
Figure 2B:
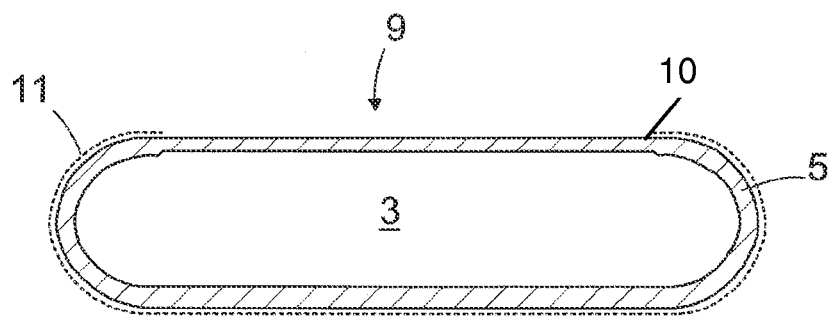
FIG. 2b is a cross section of an enclosing structure shown in FIG. 2a, FIG. 3 is a schematic perspective view of a cover structure according to the invention.

FIG. 2a is a schematic perspective view and FIG. 2b a cross section of a second enclosing structure 5 according to the invention. The enclosing structure 5 consists here of a one-piece tube, which is manufactured simultaneously and in one piece. In the present embodiment the cross section of the exterior of the enclosing structure 5 is constant throughout its entire length, but naturally, it is not necessary. The enclosing structure 5 is of transparent polymer material, either thermoplast, such as polymethylmethacrylate (PMMA), polycarbonate (PC), polystyrene (PS), polyethylene terephthalate (PET), or thermoset plastic.

It should be noted in this connection that the enclosing structure 5 need not necessarily be made of transparent material. Enclosing structure 5 of this kind is suitable for use, for instance, in electronic devices without a display, or if the see-through area required by the device display is provided by other than the enclosing structure 5.

FIG. 2b shows how a frame layer 11 is arranged on top of the base layer 10. The frame layer 11 indicated by a broken line is at least substantially impermeable to visible light. The frame layer 11 comprises an opening at which the base layer 10 is left uncovered. Thus, at the opening there is a see-through area 9, through which is provided visual contact into a cavity 3. The see-through area 9 is thus provided by defining it by a frame layer 11.

Optical properties, such as transparency, of the see-through area 9 are often subjected to high quality requirements that are not necessary in other parts of the enclosing structure 5. Therefore, the factors affecting the optical properties of the parts of the enclosing structure 5 in the see-through area 9, such as the quality of the outer and/or inner surfaces thereof, are typically different from those elsewhere in the enclosing structure 5.

A particular advantage with this embodiment is that, in addition to a seamless cover structure, it also allows manufacture of a high-quality, seamless display window in one and the same manufacturing process. Thanks to this, the structure of the cover is very simple and it is economical to manufacture.

The enclosing structure 5 and the entire cover structure may comprise, as its outermost surface, a hard coating, which is transparent throughout or at least for the see-through area 9. The hard coating is of material known per se, typically thermoset plastic, and it may be produced by methods and means known per se.

Figure 3:
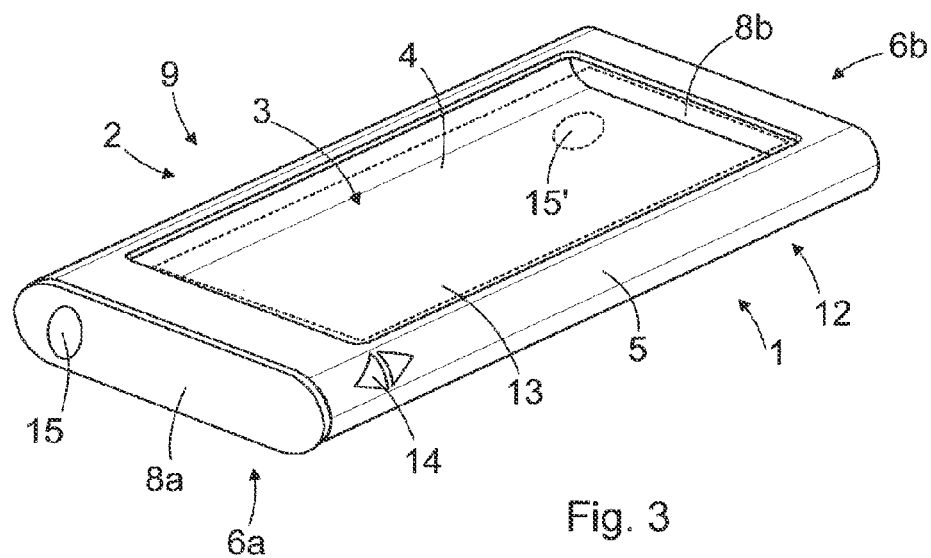

FIG. 3 is a schematic perspective view of a cover structure according to the invention. The enclosing structure 5 and the end elements 8a, 8b form a cavity 3, in which an electronic part 4 of the electronic device is fitted. The electronic part 4 is shown in broken lines in the figure. The electronic part 4 is designed such that it may be inserted into and/or removed from the cavity 3 through the end 6a, 6b of the enclosing structure.

It is to be noted that in this description the electronic device refers in particular to portable electronic devices, such as mobile phones, communicators, palmtop computers, portable computers, game consoles, game controllers, playback devices for audio and/or visual material, navigators, or the like.

The enclosing structure 5 comprises an opening 12, which is covered by a protective window 13 for the display. The protective window 13 for the display covers the display element of the device, which is not shown in the figure but which is arranged in said cavity 3. The protective window 13 for the display is secured to the enclosing structure, for instance, by gluing or by arranging it, as an insert, into a mold that forms the polymer material into the enclosing structure 5. The protective window may be of polymer material or glass.

In the enclosing structure 5 there are arranged device activator buttons 14. For this purpose, the enclosing structure 5 may be provided with openings into which the actual activator button 14 is arranged. The activator button 14 may a capacitive activator button, for which no opening is needed in the enclosing structure 5. In addition to the activator button 14, a connector or an optical element 15 of a camera, such as a protective window for a camera lens, for instance, may be arranged in the enclosing structure. Said protective window may be provided in the same way as the protective window 13 for the display, i.e. by providing it from the transparent part of the enclosing structure 5, or by attaching a separately made protective window to the enclosing structure 5.

In the end element 8a, 8b it is also possible to arrange actuator buttons, connectors or the like. In the embodiment of FIG. 3, optical elements 15 of a camera are arranged in the first end element 8a.

Figure 4:
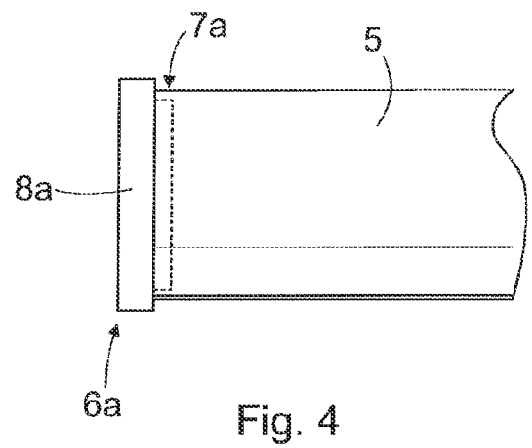
FIG. 4 is a schematic side view of a detail of the cover structure according to the invention.

FIG. 4 is a schematic side view of an end element of the cover structure according to the invention.

The end element 8a is arranged in a receiving structure 7a at the end of the enclosing structure 5. The receiving structure 7a may have been milled dimensionally accurate, for instance, by CNC machining or the like.

The end element 8a and the receiving structure 7a form a substantially closed and tight structure. The end element 8a may be attached to the enclosing structure 5 in the receiving structure 7a, or the end element may be attached to another structure of the electronic device 1, for instance, to the device frame.

In the embodiment of FIG. 4 the end element 8a is dimensioned to be larger than outer measurements of the end 6a of the enclosing structure. Advantages of this solution include, for instance, that the electronic device is supported by the end elements and not by the enclosing structure while resting on a table or another surface like that. This reduces a risk of the enclosing structure 5 getting scratched. The end element 8a, 8b may also be dimensioned differently, for instance, to equal exactly the outer measurements of the end 6a of the enclosing structure.

The end element 8a, 8b may be made, for instance, of polymer material or metal or a combination thereof. In an embodiment the end element is made partly or completely of substantially elastic material, for instance, thermoplastic elastomer or rubber. Naturally, apart from the planar piece of FIG. 4, the end element 8a, 8b may also be designed to be a three-dimensional piece.

Figure 5:
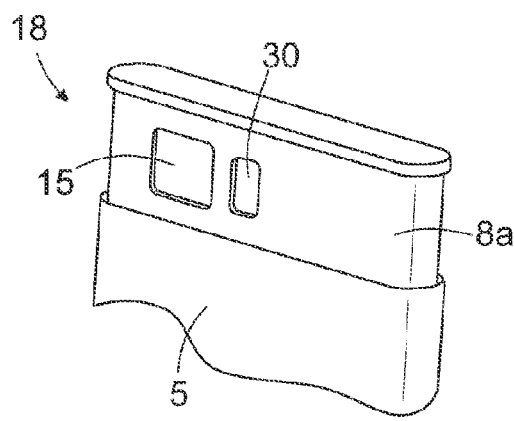
FIG. 5 is a schematic perspective view of a second detail of the cover structure according to the invention.

FIG. 5 is a schematic perspective view of a second end element of a cover structure according to the invention. The end element 8a, 8b forms a pop-up element, which may be locked inside the enclosing structure 5 and wherefrom it may be restored to the position shown in FIG. 5 by releasing said locking. In the end element 8a it is possible to arrange a spring or another member like that, which moves the end element from inside the enclosing structure 5, or the end element 8a may be withdrawn by hand.

In the end element 8a there are arranged the optical elements 15 of the camera and the actual camera 18 with its flash equipment 30. One of the advantages with the structure is that the optical elements of the camera 18 will be sheltered inside the enclosing structure 5, when the camera is not in use.

Naturally, in the camera placement of FIG. 3 it is also possible to integrate the camera itself into the cover structure 2.

Figure 6:
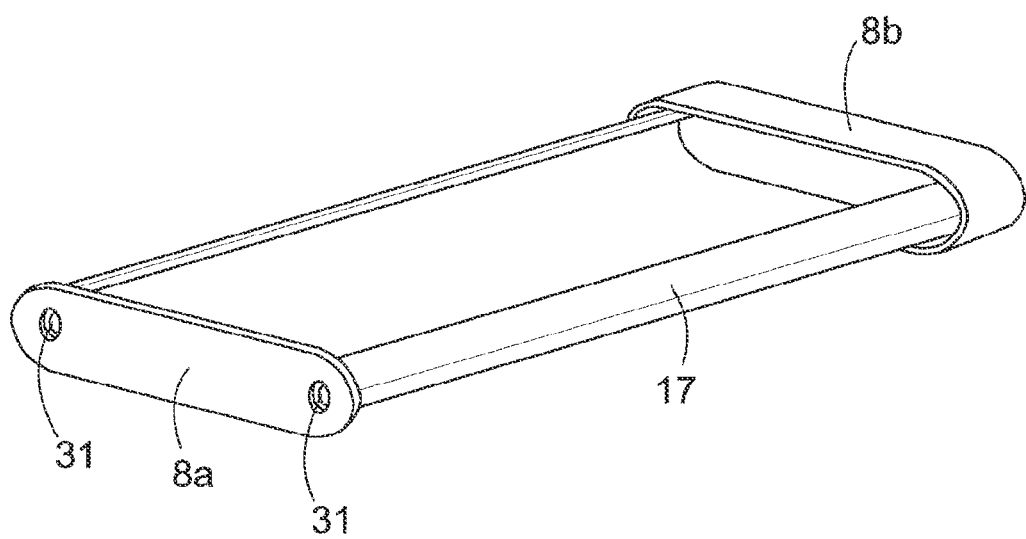
FIG. 6 is a schematic perspective view of a part of the electronic device according to the invention.

FIG. 6 is a schematic perspective view of a part of the electronic device according to the invention. The electronic device comprises a device body 17, which is insertable inside the enclosing structure 5 and, correspondingly, removable from inside the enclosing structure 5 through the end 6a, 6b of the enclosing structure. Advantageously the electronic part 4 of the device may be arranged in a space reserved for it in the device body 17 such that it is insertable, together with the body 17, inside the enclosing structure 5, and correspondingly, removable from inside the enclosing structure 5 through the end 6a, 6b of the enclosing structure.

The device body 17 may be made by methods known per se, for instance, of polymer material, preferably reinforced polymer material, or of metal or a combination thereof. The end elements 8a, 8b are secured to the device body 17 with end element securing members 31, such as screws. In addition, the end elements 8a, 8b are arranged in the ends of the enclosing structure such that a tight joint will be provided.

The end elements 8a, 8b may be made of polymer material or metal or the like, just like the device body 17. The second end element 8b is dimensioned and shaped such that the second end of the enclosing structure is fitted between the second end element and the device body 17. Thus is obtained a structure that protects the second end of the enclosing structure particularly well. Naturally, this kind of end element structure may also be used in the first end of the enclosing element.

The device body 17 constitutes a load-bearing part of the electronic device. Thus, the enclosing structure 5 may be made lighter than in a structure where the enclosing structure 5 is an essential part of the load-bearing structure of the electronic device. A particularly durable structure will be obtained by using the device body 17 together with end elements similar to those shown in FIG. 4, in other words, when the end elements are dimensioned to be larger than the outer measurements of the end of the enclosing structure.

Figure 7:
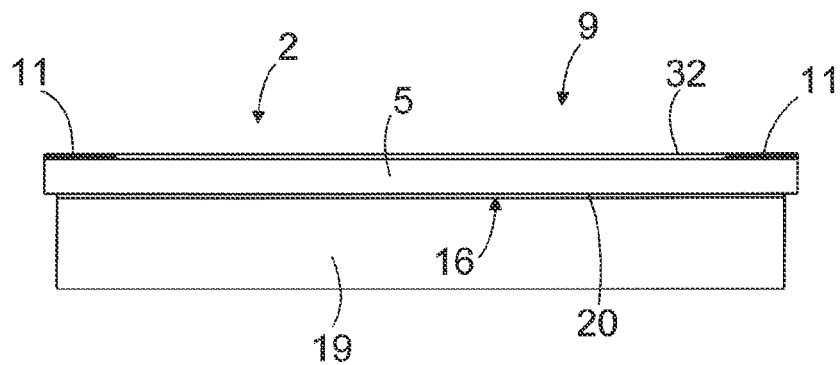
FIG. 7 is a schematic cross-sectional side view of the electronic device according to the invention.

FIG. 7 is a schematic cross-sectional side view of the electronic device according to the invention.

An outer part of the cover structure 2 consists of a transparent hard coating 32, which covers both the see-through area 9 and the frame layer 11 surrounding it. The frame layer 11 may be provided by an adhesive tape or sticker or by painting it on the outer surface—like in the figure—or on the inner surface of the enclosing structure 5 or inside the enclosing structure 5 itself. The frame layer 11 may also be provided by an IML (In Mold Labeling) film, or by coating the enclosing structure 5 in the mold with thermoset plastic.

Under the see-through area 9 there is arranged a display element 19. The display element may comprise not only the display but also a light source required for its illumination, such as a led or the like. The display element 19 preferably comprises a touch screen, most preferably a capacitive touch screen.

In the see-through area 9 the enclosing structure 5 is constant in thickness. The inner surface 16 of the enclosing structure 5 may be arranged to be in immediate contact with the display element 19, or as in FIG. 7, it is possible to arrange transparent filler 20, such as transparent glue, therebetween. The filler 20 may be fitted into place by using negative pressure suction, for instance. Depending on the chemical composition of the filler 20, it may be hardened, for instance, by UV radiation that is directed through the see-through area 9 to the filler 20.

The refractive index $n_2$ of the filler 20 is at least substantially as high as the refractive index $n_1$ of the enclosing structure 5. In that case, scratches or the like on the inner surface 16 do not cause visual flaws that would impede the visibility of the display.

The enclosing structure 5 shown in FIG. 7 may be manufactured, for instance, in the manner described in connection with FIGS. 10a and 10b.

Figure 8:
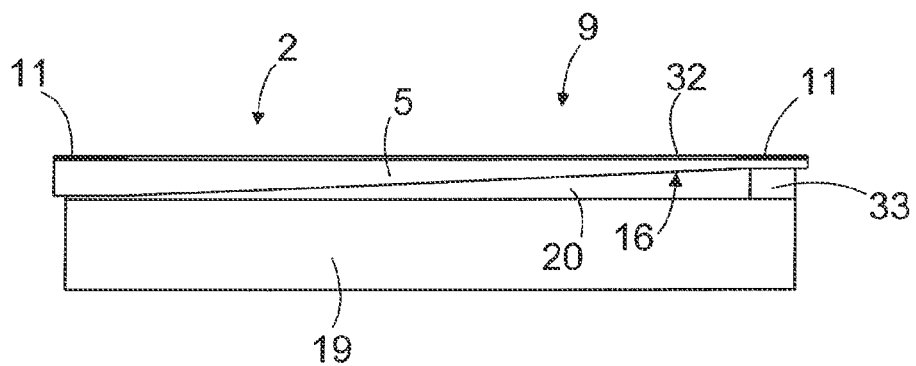
FIG. 8 is a second schematic cross-sectional side view of the electronic device according to the invention.

FIG. 8 is a schematic cross-sectional side view of a second electronic device according to the invention. This solution comprises the structures already described in connection with FIG. 7, with the exception that the enclosing structure 5, at the see-through area 9, becomes thinner from the first end 6a direction to the second end 6b direction. Because of this the inner surface 16 forms a wedge-like surface and the inner surface 16 provides a surface at an acute angle to the display element 19. The wedge-like space between the inner surface 16 and the display element 19 is filled with a transparent filler 20, the refractive index $n_2$ of which is at least substantially as high as the refractive index $n_1$ of the enclosing structure 5.

Thus, the angular difference between the inner surface 16 and the display element 19 does not pose problems to display readability. The wedge-like part of the inner surface 16 preferably extends throughout the entire length of the enclosing structure 5, which facilitates the removal of the enclosing structure 5 from the mold.

On the edge of the display element 19 there is arranged support material 33, for instance glue, which adheres and/or positions the element 19 to the enclosing structure 5.

The enclosing structure 5 shown in FIG. 8 may be manufactured, for instance, by injection molding in a mold, in which the inner surface 16 of the see-through area 9 is formed against a core having a wedge-like surface and providing a mold cavity part that is wedge-like in cross section. When the polymer material is sufficiently hardened, the core having the wedge-like surface is moved away from the inner surface of the see-through area 9 in the direction of the second end 6b, whereby the core becomes detached from the inner surface 16.

Core detachment and movement in relation to the inner surface 16 may produce scratches on the inner surface 16, but they are relatively insignificant, because the core detaches from the inner surface 16 immediately upon starting to move and consequently it does not chafe the inner surface. All sorts of scratches deteriorate the display readability. In case scratches appear on the inner surface, the damage caused by them will be substantially reduced by using the above-mentioned filler 20 between the display element and the enclosing structure.

Figure 9:
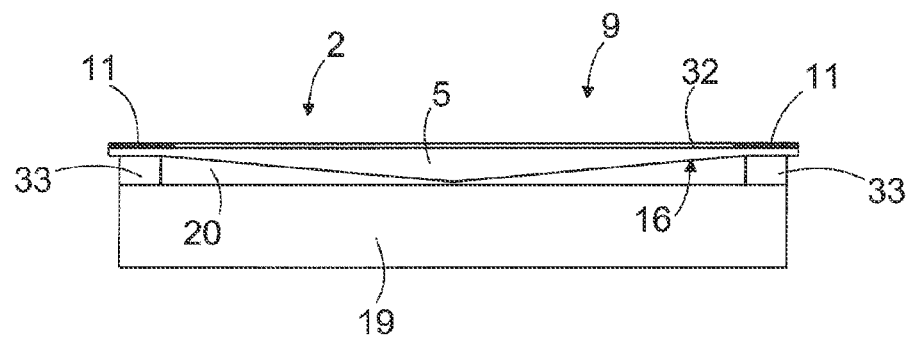
FIG. 9 is a third schematic cross-sectional side view of the electronic device according to the invention.

FIG. 9 is a third schematic cross-sectional side view of the electronic device according to the invention. Here the enclosing structure 5 becomes thinner in the see-through area 9 both in the direction of the first end 6a of the enclosing structure 5 and in the direction of the second end 6b. Consequently, the inner surface 16 forms a double-wedge-like surface and between the enclosing structure 5 and the display element 19 there is a double-wedge-like space. This space is filled with a transparent filler 20, the refractive index $n_2$ of which is at least substantially as high as the refractive index $n_1$ of the enclosing structure 5. The double-wedge-like part of the inner surface 16 preferably extends throughout the entire length of the enclosing structure 5, which facilitates the removal of the enclosing structure 5 from the mold.

The structure of FIG. 9 may be manufactured, for instance, by injection molding it in a mold cavity part having a double-wedge-like cross section, in which the inner surface 16 of the see-through area 9 is shaped by two successively arranged cores having a wedge-like surface and pointing to opposite directions. After the polymer material is hardened, the first core having the wedge-like surface is moved in the direction of the first end 6a, and correspondingly, the second core having the wedge-like surface is moved in the opposite direction, that of the second end 6b, away from inner surface of the see-through area 9.

Figure 10A:
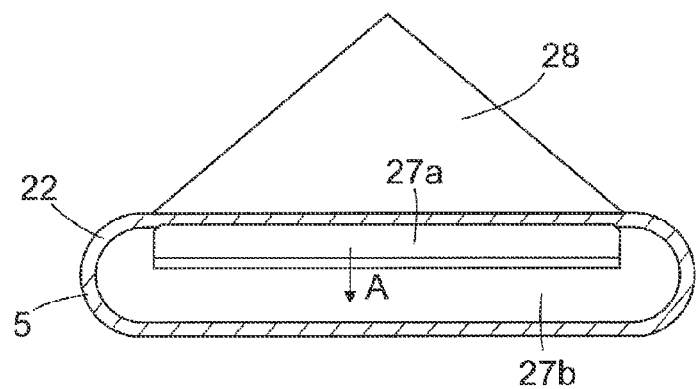
FIG. 10a shows schematically a step of the method according to the invention, seen from the end of the enclosing structure.
Figure 10B:
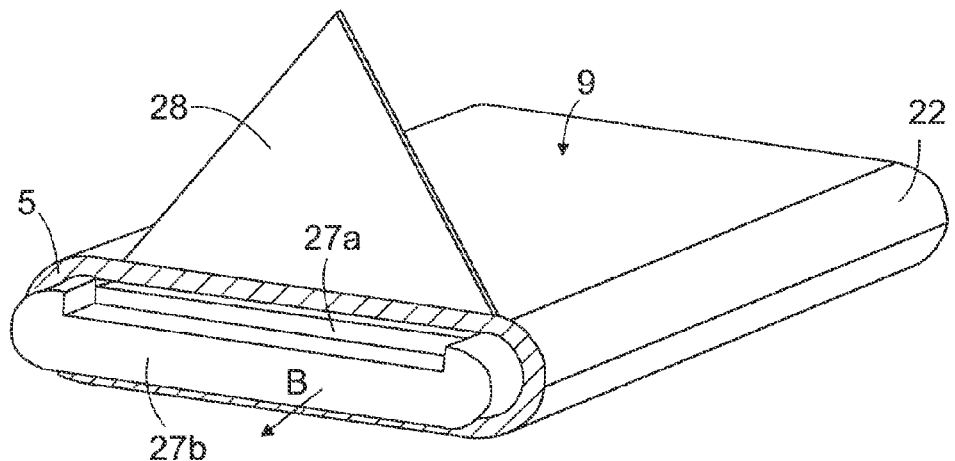
FIG. 10b shows schematically a second step of the method in FIG. 10a, seen as a perspective view.

FIG. 10a shows schematically a step of the method according to the invention, seen from the end of the enclosing structure, and FIG. 10b is a perspective view of a second step of the same method.

In the method, transparent material is injection molded to form a molded piece 22, which is processed into the enclosing structure 5 in subsequent method steps. The polymer material, which forms the see-through area 9, is injected into a mold cavity part which has parallel mold surfaces and where a first core part 27a forms the inner surface 16 of the see-through area 9.

The first core part 27a is arranged in a groove belonging to a second core part 27b. The first core part 27a may move perpendicularly to said groove such that the thickness of the core consisting of core parts 27a, 27b may be changed. In addition, the second core part 27b is movable together with the first core part 27a fitted thereto with respect to the mold cavity. The movements of the core parts 27a, 27b may be implemented in manners known per se, for instance, hydraulically.

Together with the surface of the mold cavity, the first core part 27a forms a space, in which the polymer material of the see-through area 9 is hardened to form a layer of at least substantially constant thickness.

After hardening of the polymer material the first core part 27a is moved away, as indicated by arrow A, perpendicularly to the inner surface of the see-through area 9 into the groove of the second core part 27b.

When the first core part 27a has come off the inner surface of the see-through area 9, both of the core parts 27a, 27b may be removed from inside the molded piece 22, in the direction of arrow B, whereafter the mold is opened and the molded piece 22 is removed from the mold.

Because the first core part 27a moves perpendicularly away from the inner surface of the see-through area 9, no scratches or other mechanical damages are produced thereon, at least not to any substantial extent. In other words, the inner surface is optically of high quality.

The molded piece 22 comprises an injection gate stalk 28 which is arranged at the end of the molded piece 22. In an embodiment of the method, the injection gate stalk 28 and the annular end of the molded piece in close contact therewith are detached from the part constituting the enclosed structure 5 by cutting or sawing. Thus, the injection gate stalk 28 will leave no traces on the enclosing structure 5. Before detachment, the injection gate stalk 28 may be utilized as a jig or a holder in further processing of the enclosing structure 5, for instance, in painting. It is possible, of course, to place and shape the injection gate also in some other manner.

In some cases, features disclosed in this application may be used as such, irrespective of other features. On the other hand, when necessary, the features disclosed in this application may be combined to provide various combinations.

In conclusion, it may be stated that the cover structure of the invention is characterized by comprising an enclosing structure, which is tubular in shape, and at least one end of which enclosing structure is open, said end comprising a receiving structure for fitting an end element, which closes said end, into the enclosing structure.

Further, it may be stated that the electronic device of the invention is characterized in that the cover structure comprises an enclosing structure, which is tubular in shape, and at least one end of which enclosing structure is open comprising a receiving structure for fitting an end element, which closes said end, into the enclosing structure.

Yet further, it may be stated that the method of the invention is characterized by making an enclosing structure, which is tubular in shape and has at least one open end, forming in said end a receiving structure and closing said end with an end element, which is fitted in the receiving structure.

The drawings and the related description are only intended to illustrate the idea of the invention. It is apparent to a person skilled in the art that the invention is not restricted to the embodiments described above, in which the invention is described by way of example, and many modifications and different embodiments of the invention are possible within the scope of the inventive idea defined in the following claims.

The invention claimed is:

1. A cover structure for an electronic device, which provides a cavity into which an electronic part of the electronic device is fitted, wherein the cover structure comprises an enclosing structure, which is tubular in shape and at least one end of which enclosing structure is open, said end comprising a receiving structure for fitting an end element, which closes said end, into the enclosing structure;
   wherein the enclosing structure comprises a see-through area, through which visual contact into the cavity is provided;
   wherein in the see-through area the enclosing structure becomes thinner from the first end towards the second end so that an inner surface thereof forms a wedge-like surface.

2. The cover structure of claim 1, wherein the enclosing structure is one piece.

3. The cover structure of claim 1, wherein the enclosing structure is a structure consisting of several pieces whose joint lines are finished to be seamless on the exterior.

4. The cover structure of claim 1, wherein the dimensions of the first end of the enclosing structure are equal to those of the second end.

5. The cover structure of claim 1, wherein the end element is dimensioned to be larger than the outer measurements of the enclosing structure.

6. The cover structure of claim 1, wherein the enclosing structure is made of transparent material and the see-through area comprises said transparent material.

7. The cover structure of claim 6, wherein the see-through area is provided by defining the see-through area with a frame layer.

8. The cover structure of claim 1, wherein the enclosing structure is constant in thickness in the see-through area.

9. The cover structure of claim 1, wherein the see-through area comprises an opening in the enclosing structure and a protective window for a display is arranged in said opening.

10. A cover structure for an electronic device, which provides a cavity into which an electronic part of the electronic device is fitted, wherein the cover structure comprises an enclosing structure, which is tubular in shape and at least one end of which enclosing structure is open, said end comprising a receiving structure for fitting an end element, which closes said end, into the enclosing structure;
    wherein the enclosing structure comprises a see-through area, through which visual contact into the cavity is provided;
    wherein in the see-through area the enclosing structure becomes thinner both in the first end direction and in the second end direction so that an inner surface thereof forms a double-wedge-like surface.

11. An electronic device comprising a cover structure which provides a cavity into which an electronic part of the electronic device is fitted, wherein the cover structure comprises an enclosing structure, which is tubular in shape and at least one end of which enclosing structure is open, said end comprising a receiving structure for fitting an end element, which closes said end, into the enclosing structure;
    wherein the electronic device comprises a display element and the enclosing structure comprises a see-through area of transparent material arranged over the display element;
    wherein the enclosing structure becomes thinner in the see-through area from the first end direction to the second end direction such that an inner surface of the enclosing structure forms a wedge-like surface and the wedge-like space between the enclosing structure and the display element is filled with transparent filler.

12. The electronic device of claim 11, wherein the electronic part is designed such that the electronic part may be at least one of inserted into and removed from the cavity through the end.

13. The electronic device of claim 11 comprising a camera, the optical elements of which are arranged in the end element.

14. The electronic device of claim 13, wherein the end element constitutes a pop-up element, and the optical elements of the camera are arranged to have shelter inside the enclosing structure by moving the end element.

15. The electronic device of claim 11, wherein the refractive index of the transparent filler is at least substantially as high as the refractive index of the enclosing structure.

16. An electronic device comprising a cover structure which provides a cavity into which an electronic part of the electronic device is fitted, wherein the cover structure comprises an enclosing structure, which is tubular in shape and at least one end of which enclosing structure is open, said end comprising a receiving structure for fitting an end element, which closes said end, into the enclosing structure;
wherein the electronic device comprises a display element and the enclosing structure comprises a see-through area of transparent material arranged over the display element;
wherein the enclosing structure becomes thinner in the see-through area both in the first end direction and in the second end direction such that an inner surface of the enclosing structure forms a double-wedge-like surface and the double-wedge-like space between the enclosing structure and the display element is filled with transparent filler.

17. A method for manufacturing a cover structure for an electronic device, the method comprising:
manufacturing an enclosing structure which is tubular in shape and which has at least one open end;
providing said end with a receiving structure;
closing said end with an end element which is fitted in the receiving structure;
molding a molded piece of transparent polymer material,
conveying the polymer material, which forms the see-through area, into the mold cavity part which has a wedge-like cross section and where the inner surface of a see-through area is formed by a core having a wedge-like surface;
allowing the polymer material, which forms the see-through area, to harden to provide a layer that becomes thinner towards the first end of the enclosing structure; and
moving the core having the wedge-like surface away from the inner surface of the see-through area towards the first end.

18. The method of claim 17, wherein the entire enclosing structure is manufactured simultaneously and in one piece.

19. The method of claim 17, wherein there are manufactured at least two parts for the enclosing structure, said parts are interconnected to form the enclosing structure and the outer surface of the enclosing structure is finished to be seamless.

20. The method of claim 17, the method comprising manufacturing a molded piece by injection molding,
arranging an injection gate of the injection mold at the end of the molded piece, and
machining off the end of the molded piece a part that comprises an injection gate stalk.

21. The method of claim 17, the method comprising providing a see-through area by arranging in the mold a window insert and by molding the molded piece such that at least part of the window insert will remain transparent.

22. A method for manufacturing a cover structure for an electronic device, the method comprising:
manufacturing an enclosing structure which is tubular in shape and which has at least one open end;
providing said end with a receiving structure;
closing said end with an end element which is fitted in the receiving structure;
molding a molded piece of transparent polymer material;
conveying the polymer material, which forms the see-through area, into the mold cavity part which has a double-wedge-like cross section and where the inner surface of a see-through area is formed by two successively placed cores having a wedge-like surface;
allowing the polymer material, which forms the see-through area, to harden to provide a layer that becomes thinner towards the first end and towards the second end of the enclosing structure; and
moving the first core having the wedge-like surface, when the polymer material is hardened, in the direction of the first end, and correspondingly, the second core having the wedge-like surface in the opposite direction, that of the second end, away from inner surface of the see-through area.

* * * * *